(12) United States Patent
Haruna et al.

(10) Patent No.: US 11,292,077 B2
(45) Date of Patent: Apr. 5, 2022

(54) REFILL FRICTION STIR SPOT WELDING METHOD AND REFILL FRICTION STIR SPOT WELDING DEVICE

(71) Applicant: KAWASAKI JUKOGYO KABUSHIKI KAISHA, Kobe (JP)

(72) Inventors: Shunsuke Haruna, Kakamigahara (JP); Shintaro Fukada, Kobe (JP); Noriyuki Taniyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 109 days.

(21) Appl. No.: 16/644,869

(22) PCT Filed: Sep. 3, 2018

(86) PCT No.: PCT/JP2018/032550
§ 371 (c)(1),
(2) Date: Mar. 5, 2020

(87) PCT Pub. No.: WO2019/049814
PCT Pub. Date: Mar. 14, 2019

(65) Prior Publication Data
US 2020/0282491 A1 Sep. 10, 2020

(30) Foreign Application Priority Data

Sep. 5, 2017 (JP) .............................. JP2017-170346

(51) Int. Cl.
*B23K 20/00* (2006.01)
*B23K 20/12* (2006.01)
*B23K 26/36* (2014.01)

(52) U.S. Cl.
CPC ...... *B23K 20/1265* (2013.01); *B23K 20/1255* (2013.01); *B23K 26/36* (2013.01); *B23K 20/125* (2013.01)

(58) Field of Classification Search
CPC ............ B23K 20/1255; B23K 20/1265; B23K 20/122; B23K 20/123; B23K 20/126;
(Continued)

(56) References Cited

U.S. PATENT DOCUMENTS 8,950,650 B2 * 2/2015 Okada ................ B23K 20/1265
228/102
9,095,926 B2 * 8/2015 Okada ................ B23K 20/1265
(Continued)

FOREIGN PATENT DOCUMENTS

CN 106994554 A 8/2017
JP 2003-245782 A 9/2003
(Continued)

OTHER PUBLICATIONS

Feb. 5, 2021 Search Report issued in Chinese Patent Application No. 201880057112.7.

*Primary Examiner* — Erin B Saad
(74) *Attorney, Agent, or Firm* — Oliff PLC (57) ABSTRACT

A friction stir spot welding method performs friction stir spot welding of a pair of workpieces having a coating film formed on at least one welding surface by using a refill friction stir spot welding device including rotary tools. The method includes removing the coating film by plunging a distal end of the shoulder member into one workpiece up to a position closer to the surface than the welding surface, while rotating the shoulder member as a rotary tool around the axis, and rotating the shoulder member in a state in which the surface of one of the pair of workpieces, with the welding surfaces being overlaid on each other, is pressed by the end face of the clamp member and performing friction stir spot welding of the pair of workpieces after the coating film removal by using the pin member and the shoulder member as rotary tools.

8 Claims, 6 Drawing Sheets

(58) Field of Classification Search
CPC .. B23K 20/125; B23K 20/22; B23K 2101/18; B23K 20/002; B23K 20/12; B23K 20/1225; B23K 20/124; B23K 20/1245; B23K 20/128; B23K 20/24; B23K 20/26; B23K 2101/006; B23K 2103/00
See application file for complete search history.

(56) References Cited

U.S. PATENT DOCUMENTS

| | | | |
|---|---|---|---|
| 9,314,870 B2 * | 4/2016 | Okada | B23K 20/123 |
| 10,201,873 B2 * | 2/2019 | Okada | B23K 20/124 |
| 10,293,431 B2 | 5/2019 | Okada et al. | |
| 11,045,898 B2 * | 6/2021 | Haruna | B23K 20/1255 |
| 11,084,121 B2 * | 8/2021 | Hirano | B23K 20/1265 |
| 2006/0289604 A1 * | 12/2006 | Zettler | B23K 20/128 |
| | | | 228/2.1 |
| 2014/0069985 A1 * | 3/2014 | Okada | B23K 20/1255 |
| | | | 228/112.1 |
| 2014/0069986 A1 * | 3/2014 | Okada | B23K 20/123 |
| | | | 228/112.1 |
| 2015/0231734 A1 * | 8/2015 | Okada | B23K 20/1265 |
| | | | 228/2.1 |
| 2017/0304935 A1 * | 10/2017 | Okada | B23K 20/24 |

FOREIGN PATENT DOCUMENTS

| | | | |
|---|---|---|---|
| JP | 2006-167793 A | | 6/2006 |
| JP | 2006-175504 A | | 7/2006 |
| JP | 2012-196682 A | | 10/2012 |
| JP | 2015-180513 A | | 10/2015 |
| WO | WO-2016063538 A1 * | 4/2016 | ............ B23K 20/22 |
| WO | WO2016/098341 A1 | | 4/2017 |

* cited by examiner

REFILL FRICTION STIR SPOT WELDING METHOD AND REFILL FRICTION STIR SPOT WELDING DEVICE

TECHNICAL FIELD

The present invention relates to a technique of improving the welding strength of a joint portion when a pair of workpieces having coating films formed on welding surfaces are welded by a refill friction stir spot welding method.

BACKGROUND ART

For example, as disclosed in PTL 1, there is known a refill friction stir spot welding device provided with a pin member and a shoulder member that can rotate around a predetermined axis independently of each other and advance and retract in the axial direction, and a clamp member that surrounds an outer periphery of the shoulder member and can advance and retract in the axial direction.

CITATION LIST

Patent Literature

PTL 1: JP 2012-196682A

SUMMARY OF INVENTION

Technical Problem

A coating film is formed on the welding surfaces of a pair of workpieces to be subjected to friction stir spot welding in some cases. When a pair of workpieces having coating films formed on welding surfaces are subjected to friction stir spot welding using a refill friction stir spot welding device, a coating film remains in the friction-stirred region of the pair of workpieces. This may lead to a decrease in welding strength.

The present invention has been made in view of this problem and aims at preventing a decrease, by coating films, in the welding strength of a joint portion of a pair of workpieces having coating films formed on welding surfaces in a case in which the pair of workpieces are welded by a refill friction stir spot welding method.

Solution to Problem

In order to solve the above problems, a friction stir spot welding method according to one aspect of the present invention performs friction stir spot welding of a pair of workpieces having a coating film formed on at least one welding surface by using a refill friction stir spot welding device including rotary tools. The rotary tools includes a pin member that rotates around a predetermined axis and is provided to be able to advance and retract in a direction of the axis, a shoulder member that rotates around the axis while surrounding an outer periphery of the pin member and is provided independently of the pin member so as to be able to advance and retract in the direction of the axis, and a clamp member that has an end face able to press a surface of one of the pair of workpieces by coming into surface contact with the surface and is provided to surround an outer periphery of the shoulder member. The method includes a coating film removal step of removing the coating film by plunging a distal end of the shoulder member into the one workpiece up to a position closer to the surface than the welding surface, while rotating the shoulder member around the axis, and rotating the shoulder member in a state in which the surface of one of the pair of workpieces, with the welding surfaces being overlaid on each other, is pressed by the end face of the clamp member, and a welding step of performing friction stir spot welding of the pair of workpieces after the coating film removal step by using the pin member and the shoulder member.

According to the above method, the coating film formed on at least one welding surface of the pair of workpieces is removed in the coating film removal step before the welding step. For this reason, it is possible to prevent the coating film from remaining in the friction-stirred region of the pair of workpieces to be welded by friction stir spot welding in the welding step. Therefore, it is possible to prevent a decrease in the welding strength of the joint portion of the workpiece due to a coating film.

In the coating film removal step, the coating film may be thermally decomposed by heat generated by rotation of the shoulder member. As described above, by removing the coating film using the heat generated by the rotation of the shoulder member, the coating film can be efficiently removed from the welding surface.

In the coating film removal step, after the distal end of the shoulder member is plunged into the one workpiece up to a standby position located closer to the surface than the welding surface while the shoulder member is rotated around the axis, the distal end of the shoulder member may be made to stand by for a predetermined time while being located at the standby position.

According to the above method, in the coating film removal step, the amount of heat input from the rotating shoulder member to the welding surface can be increased to heat the coating film to a temperature equal to or more than the thermal decomposition temperature by making the shoulder member stand by for a predetermined time while the distal end of the shoulder member is located at the standby position, thereby properly decomposing the coating film.

The method may further include a return step of returning the distal end of the shoulder member from the standby position to the surface position of the one workpiece between the coating film removal step and the welding step. According to the above method, after the coating film is thermally decomposed, the coating film is made to easily come into contact with air. This makes it possible to easily diffuse the decomposed components of the coating film into the air.

In the coating film removal step, the distal end of the shoulder member may be plunged at a first speed from the surface of the one workpiece to a reference position located closer to the surface than the welding surface of the one workpiece while the shoulder member is rotated around the axis, and the distal end of the shoulder member may be plunged from the reference position to the welding position at a second speed lower than the first speed.

According to the above method, in the coating film removal step, plunging the distal end of the shoulder member into one workpiece at a second speed lower than the first speed from the reference position to the welding position makes it possible to properly decompose the coating film by heating the coating film to a temperature equal to or more than the thermal decomposition temperature by using the heat generated by the rotation of the shoulder member.

The method may further include a preliminary step of standing by for a predetermined time while rotating the shoulder member around the axis in a state in which the surface of the one workpiece is pressed by the end face of the clamp member before the coating film removal step.

According to the above method, preliminary heating the surface of one workpiece in the preliminary step makes it possible to further improve the welding strength of the joint portion of the pair of workpieces.

A refill friction stir spot welding device according to another aspect of the present invention is a refill friction stir spot welding device that performs friction stir spot welding of a pair of workpieces having a coating film formed on at least one welding surface. The device includes rotary tools, a tool driving unit configured to drive the rotary tools, and a control unit configured to control the tool driving unit. The rotary tools includes a pin member that rotates around a predetermined axis and is provided to be able to advance and retract in a direction of the axis, a shoulder member that rotates around the axis while surrounding an outer periphery of the pin member and is provided independently of the pin member so as to be able to advance and retract in the direction of the axis, and a clamp member that has an end face able to press a surface of one of the pair of workpieces by coming into surface contact with the surface and is provided to surround an outer periphery of the shoulder member. The control unit executes coating film removal control to control the tool driving unit to remove the coating film by plunging a distal end of the shoulder member into the one workpiece up to a position closer to the surface than the welding surface, while rotating the shoulder member around the axis, and rotating the shoulder member in a state in which the surface of one of the pair of workpieces, with the welding surfaces being overlaid on each other, is pressed by the end face of the clamp member and welding control to control the tool driving unit to perform friction stir spot welding of the pair of workpieces after the coating film removal control by using the pin member and the shoulder member.

According to the above configuration, the coating film formed on at least one of the welding surfaces of the pair of workpieces is removed by the coating film removal control performed before the welding control. This prevents a coating film from remaining in the friction-stirred region of the pair of workpieces subjected to friction stir spot welding in the welding step. Therefore, it is possible to prevent a decrease in the welding strength of the joint portion of the workpiece due to a coating film.

Advantageous Effects of Invention

According to each aspect of the present invention, it is possible to prevent a decrease by coating films in the welding strength of a joint portion of a pair of workpieces having coating films formed on welding surfaces in a case in which the pair of workpieces are welded by a refill friction stir spot welding method.

DESCRIPTION OF EMBODIMENTS

Each embodiment will be described below with reference to the accompanying drawings.

First Embodiment

Figure 1:
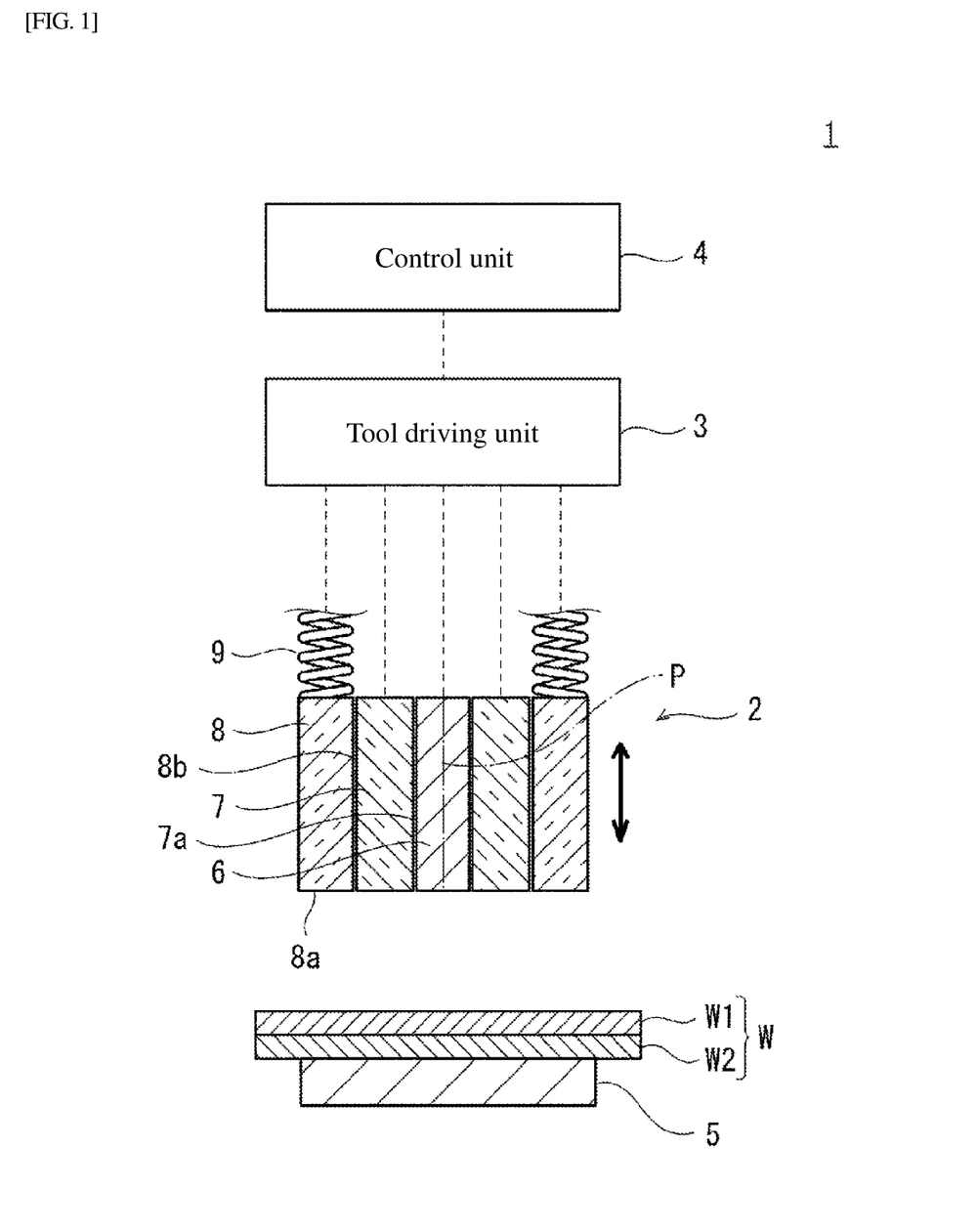
FIG. 1 is a view showing a configuration of a main part of a refill friction stir spot welding device according to a first embodiment.

FIG. 1 is a view showing a configuration of a main part of a refill friction stir spot welding device 1 according to the first embodiment. Referring to FIG. 1, a rotary tool 2 is shown in cross section, and the connection between the rotary tool 2 and a tool driving unit 3 is schematically indicated by the broken lines.

The device 1 performs friction stir spot welding of a pair of workpieces W (for example, a pair of plate materials (a first plate material W1 and a second plate material W2)). The pair of workpieces W is made of an aluminum alloy, but the material for the pair of workpieces W is not limited to this.

A coating film is formed on at least one (both in this case) of the welding surfaces of the pair of workpieces W. The coating film includes a thermally decomposable resin. Examples of the coating film include layers (surface protective layers) for protecting the surfaces of the pair of workpieces W, such as a layer mainly composed of an anticorrosive paint (for example, an epoxy resin) and a sealant.

The device 1 includes the rotary tool 2, the tool driving unit 3, a control unit 4, and a backing portion 5. The tool driving unit 3 moves the rotary tool 2 to a plurality of predetermined positions and drives the rotary tool 2 to rotate. The control unit 4 controls the tool driving unit 3 so as to drive elements 6 to 8 of the rotary tool 2. The specific structure of the tool driving unit 3 is not limited, and for example, a known structure can be used.

The control unit 4 is, for example, a computer including a CPU, a ROM, and a RAM, and controls the operation of the tool driving unit 3. The ROM stores predetermined control programs for performing coating film removal control and welding control (to be described later). The RAM stores the setting information input by the operator. The setting information includes, for example, information on each plate thickness value of the plate materials W1 and W2 and information on each welding position.

The backing portion 5 is a support portion, and is disposed on the opposite side of the pair of workpieces W to the rotary tool 2 to support the pair of workpieces W. A part of the backing portion 5 faces the rotary tool 2 with the pair of workpieces W interposed between them.

The rotary tool 2 includes a pin member 6, a shoulder member 7, and a clamp member 8. The rotary tool 2 has a nested structure in which the shoulder member 7 is disposed outside the pin member 6 and the clamp member 8 is disposed outside the shoulder member 7.

The pin member 6 is provided so as to rotate around a predetermined axis P and to advance and retract in the axis P direction. The pin member 6 of the present embodiment is formed in a columnar shape extending in the axis P direction. The rear end portion of the pin member 6 in the axis P direction (the end portion of the pin member 6 which is located on the opposite side to the pair of workpieces W) is supported by a fixing portion (not shown) of the tool driving unit 3.

The shoulder member 7 is provided around the outer periphery of the pin member 6 so as to rotate around the axis P and to be able to advance and retract in the axis P direction independently of the pin member 6. The shoulder member 7 has a hollow portion 7a, and the pin member 6 is inserted into the hollow portion 7a of the shoulder member 7.

In the rotary tool 2 of the present embodiment, the pin member 6 and the shoulder member 7 are provided so as to independently rotate around the axis P and advance and retract in the axis P direction while the pin member 6 is inserted into the hollow portion 7a of the shoulder member 7. The shoulder member 7 is formed in a columnar shape extending in the axis P direction.

The clamp member 8 is provided so as to surround the outer periphery of the shoulder member 7. The clamp member 8 is provided independently of the pin member 6 and the shoulder member 7 so as to be able to advance and retract in the axis P direction. The clamp member 8 has a hollow portion 8b, and the shoulder member 7 is inserted into the hollow portion 8b of the clamp member 8. In addition, the clamp member 8 has an end face 8a that is in surface contact with the surface of one of the pair of workpieces W (the plate surface of the first plate material W1 in this case) and can press the surface.

A spring 9 for applying a biasing force to the clamp member 8 toward the pair of workpieces W in the axis P direction is disposed at the rear end portion of the clamp member 8 in the axis P direction. The clamp member 8 presses the pair of workpieces W supported by the backing portion 5 in the axis P direction by the urging force from the spring 9. When the clamp member 8 is retracted from the pair of workpieces W, the clamp member 8 is retracted from the pair of workpieces W while compressing the spring 9.

The device 1 may have, for example, a C-shaped frame structure. In this case, the rotary tool 2, the tool driving unit 3, and the control unit 4 may be disposed at the upper part of the device 1, and the backing portion 5 may be disposed at the lower part of the device 1. The device 1 may be attached to, for example, an articulated robot. In addition, in the device 1, the rotary tool 2, the tool driving unit 3, and the control unit 4 may be attached to the articulated robot, and the backing portion 5 may be attached to another component (positioner or the like) different from the articulated robot.

Figure 2:
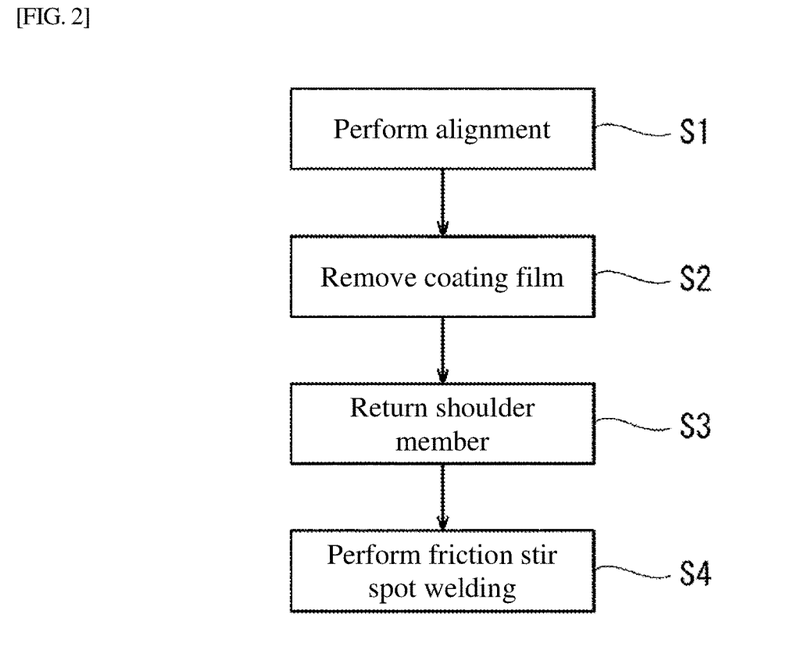
FIG. 2 is a flowchart showing a friction stir spot welding method according to the first embodiment.

FIG. 2 is a flowchart showing a friction stir spot welding method according to the first embodiment. As shown in FIG. 2, in this method, a sequence including a plurality of steps S1 to S4 in the order mentioned is performed.

Specifically, in alignment step S1, the rotary tool 2 is aligned with the pair of workpieces W in order to perform friction stir spot welding at a predetermined welding position. In coating film removal step S2 after alignment step S1, the distal end of the shoulder member 7 is plunged (pushed) into one workpiece up to a position closer to the surface of one workpiece than the welding surface of one workpiece while the shoulder member 7 is rotated about the axis P in a state in which the surface of one workpiece (the plate surface of the first plate material W1) of the pair of workpieces W, with their welding surfaces being overlaid on each other, is pressed by the end face 8a of the clamp member 8, thereby removing the coating film by the rotation of the shoulder member 7. The control unit 4 causes the tool driving unit 3 to execute coating film removal control so as to remove such a coating film.

In return step S3, after coating film removal step S2, the distal end of the shoulder member 7 is returned to the surface of one workpiece. In welding step S4, the pair of workpieces W are welded by friction stir spot welding by the pin member 6 and the shoulder member 7. The control unit 4 causes the tool driving unit 3 to perform welding control so as to perform such friction stir spot welding of the pair of workpieces W.

In the present embodiment, by performing coating film removal step S2, it is possible to prevent the coating film from remaining in the friction-stirred region of the pair of workpieces W and a decrease in the welding strength of the pair of workpieces W.

Figure 3:
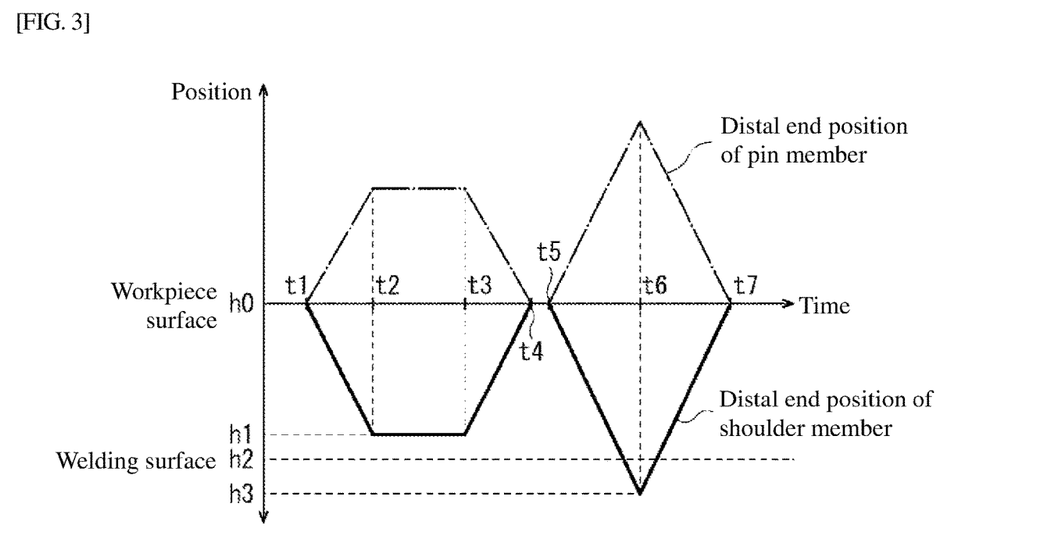
FIG. 3 is a graph showing distal end positions of a pin member and a shoulder member in the friction stir spot welding method according to the first embodiment.

FIG. 3 is a graph showing the distal end positions of the pin member 6 and the shoulder member 7 in the friction stir spot welding method according to the first embodiment. FIGS. 4(a) to 4(e) are cross-sectional views for explaining the friction stir spot welding method according to the first embodiment.

Specifically, first, the operator inputs setting information to the device 1 and causes the backing portion 5 to support the pair of workpieces W (the plate materials W1 and W2) with their welding surfaces being overlaid on each other. The control unit 4 controls the tool driving unit 3 so as to move the rotary tool 2 to a predetermined welding position (FIG. 4(a)). Thus, alignment step S1 is performed to align the rotary tool 2 with the workpiece W.

Assume that a coating film is formed on the outer surface of the pair of workpieces W. In this case, depending on the type of coating film, when the pin member 6 and the shoulder member 7 come into contact with the coating film on the outer surface of the pair of workpieces W, the position of the distal end of each of the pin member 6 and the shoulder member 7 may easily shift with respect to the position of the pair of workpieces W. Therefore, it is desirable that the operator make setting to more reliably support the pair of workpieces W by the backing portion 5 to such an extent that such positional shift can be prevented.

Figure 4:
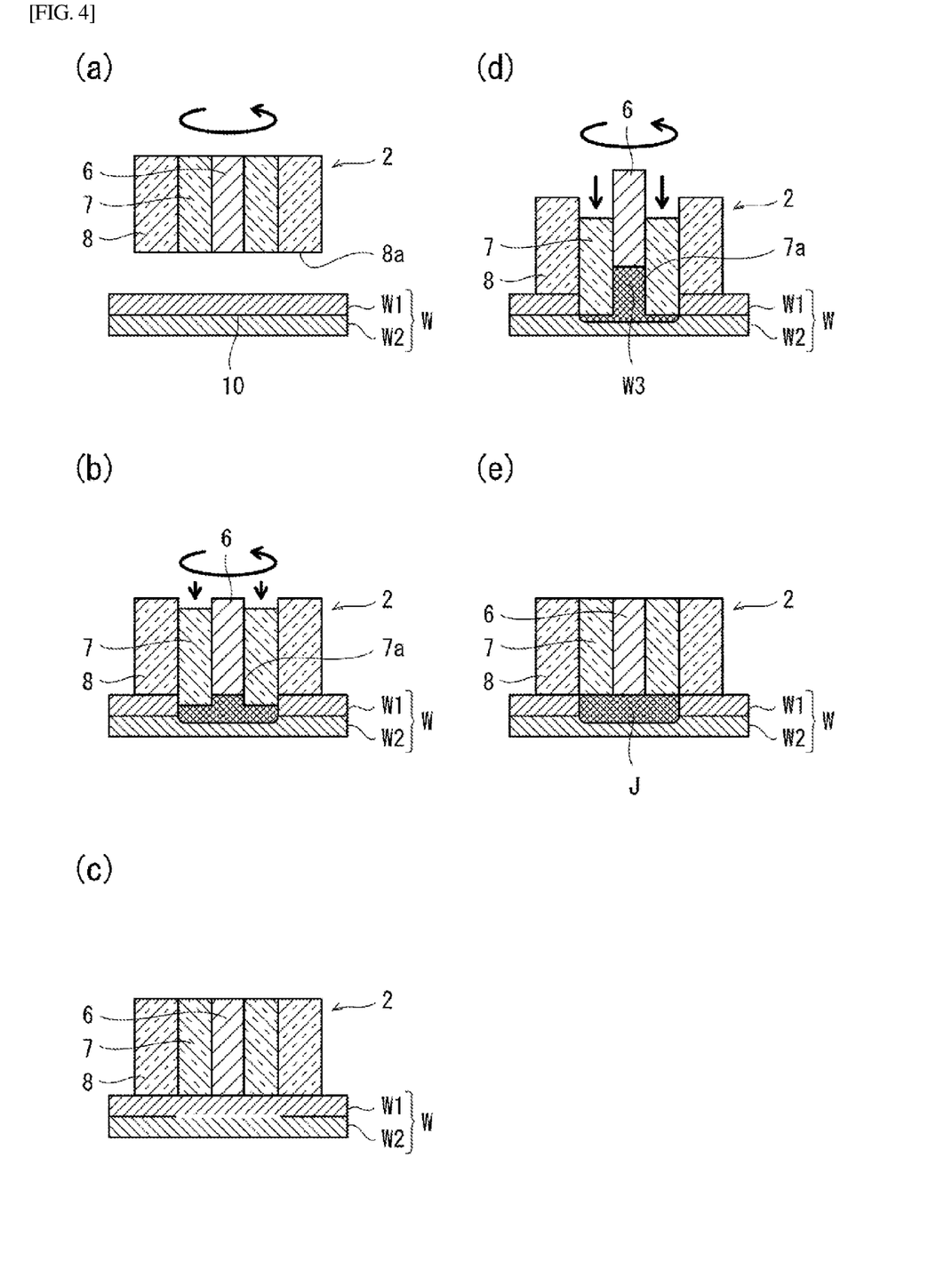
FIGS. 4(a) to 4(e) are cross-sectional views for explaining the friction stir spot welding method according to the first embodiment.

Next, the control unit 4 controls the tool driving unit 3 so as to rotate and drive the pin member 6 and the shoulder member 7, and also controls the tool driving unit 3 so as to cause the shoulder member 7 and the clamp member 8 to move to a predetermined position toward the second plate material W2 (FIG. 4(b)).

As shown in FIG. 3, at this time, the distal end of the shoulder member 7 comes into contact with a surface position h0 of the first plate material W1 at time t1, and then reaches a standby position h1 at time t2. The standby position h1 is located closer to the surface position h0 of the first plate material W1 than the welding surface (welding position h2) of the first plate material W1 inside the first plate material W1 in the plate thickness direction (the axis P direction).

In the present embodiment, after the distal end of the shoulder member 7 is plunged to the standby position h1 while the shoulder member 7 is rotated around the axis P, the shoulder member 7 is made to stand by for a predetermined time (between t2 and t3) while the distal end of the shoulder member 7 is located at the standby position h1.

When coating film removal step S2 is performed in the above manner, the coating film existing in the region of the welding surfaces of the pair of workpieces W which is friction-stirred by the pin member 6 and the shoulder member 7 is heated up to a temperature equal to or more than the thermal decomposition temperature by the heat generated by the rotation of the shoulder member 7, thus being thermally decomposed. The thermally decomposed coating film component is dispersed in the friction-stirred region by the plastic flow of the first plate material W1 and solid-dissolved in the region or vaporized and diffused into the air. Further, the coating film is stirred and dispersed by the rotation of the shoulder member 7. As a result, the coating film in the region friction-stirred by the pin member 6 and the shoulder member 7 is eliminated or greatly reduced in amount.

Note that the predetermined time (between t2 and t3) can be set as appropriate and is set to a value that can obtain a heat input amount necessary for thermally decomposing a coating film existing on the welding surface in the region for friction stir spot welding of the pair of workpieces W by the heat generated by the rotation of the shoulder member 7 plunged into the surface of one of the workpieces.

The control unit 4 controls the tool driving unit 3 to return the distal end of the shoulder member 7 from the standby position h1 to the surface position h0 in the interval between time t3 and time t4 between coating film removal step S2 and welding step S4. With this operation, return step S3 is performed (FIG. 4(c)).

In the interval between time t5 and time t6, the control unit 4 controls the tool driving unit 3 so as to move the distal end of the shoulder member 7 from the surface position h0 to a stirring position h3 located closer to the other workpiece (the second plate material W2 in this case) than the welding surfaces of the pair of workpieces W while rotating the pin member 6 and the shoulder member 7 around the axis P.

Welding step S4 is performed as described above, and a friction-stirred region J is formed in the pair of workpieces W, and the pair of workpieces W is subjected to friction stir spot welding (FIG. 4(d)). After causing the distal end of the shoulder member 7 to reach the stirring position h3 at time t6, the control unit 4 returns the distal end of shoulder member 7 to the surface position h0 at time t7 (FIG. 4(e)). Thus, steps S1 to S4 are completed.

The pair of workpieces W is friction-stirred by the shoulder member 7 in coating film removal step S2 to be welded to some extent immediately after coating film removal step S2. Executing welding step S4 reliably welds the pair of workpieces W.

Further, in the example shown in FIG. 3, the control unit 4 controls the tool driving unit 3 in conjunction with the distal end position of the shoulder member 7 so as to separate the distal end of the pin member 6 from the surface of the pair of workpieces W as the distal end of the shoulder member 7 is plunged into the pair of workpieces W and to make the distal end of the pin member 6 also approach the surface position h0 of one workpiece as the distal end of the shoulder member 7 approach the surface position h0 of one workpiece.

Accordingly, when the shoulder member 7 is plunged into the pair of workpieces W, a plastic flow portion W3 of the pair of workpieces W generated by friction stirring of the shoulder member 7 is caused to flow into the shoulder member 7. When the distal end of the shoulder member 7 is brought closer to the surface position h0 of one of the workpieces, the plastic flow portion W3 flowing into the shoulder member 7 is backfilled in the pair of workpieces W by the pin member 6.

Figure 5:
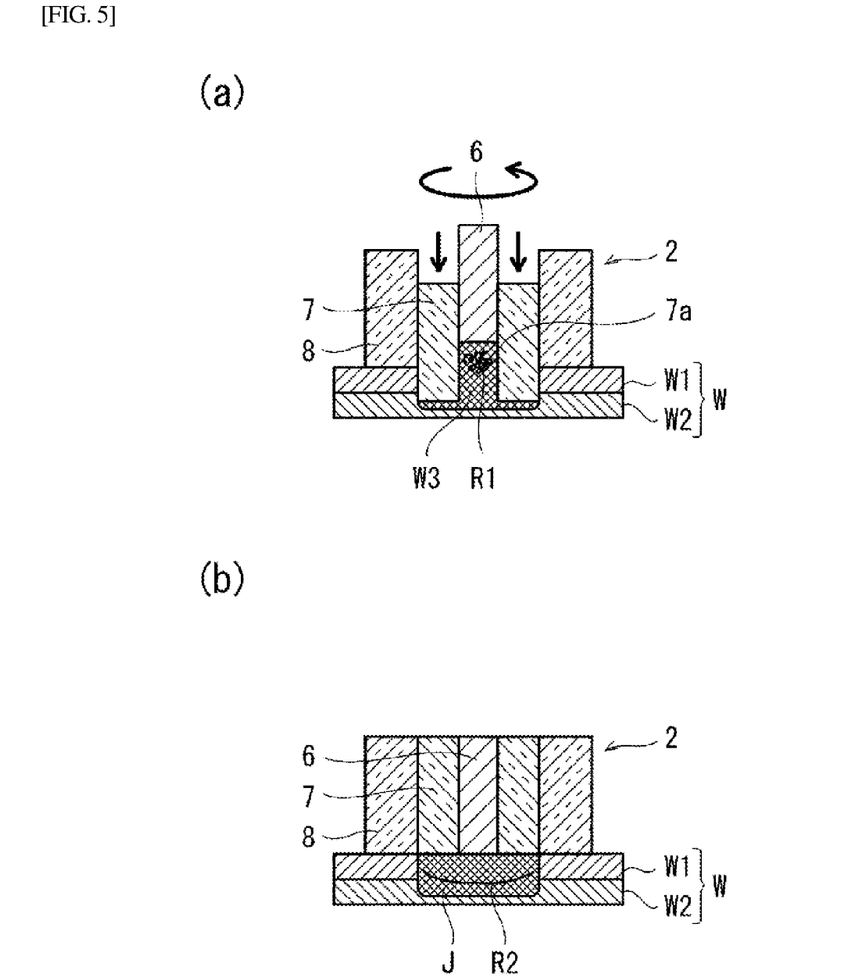
FIG. 5 is a cross-sectional view for explaining a conventional problem.

FIG. 5 is a cross-sectional view for explaining a conventional problem. When attempting to perform friction stir spot welding of the pair of workpieces W having a coating film formed on at least one of the welding surfaces using the refill friction stir spot welding device, the control unit 4 causes part of a coating film R1 to flow into the shoulder member 7 together with the plastic flow portion W3 by plunging the shoulder member 7 rotating about the axis P into the pair of workpieces W (FIG. 5(a)).

In this case, the temperature of the pair of workpieces W (plastic flow portion W3) inside the shoulder member 7 is lower than the temperature of the pair of workpieces W near the distal end of the shoulder member 7. Further, because the inside of the shoulder member 7 is isolated from the outside air, the coating film R1 flowing into the shoulder member 7 is not easily oxidized. Therefore, the coating film R1 flowing into the shoulder member 7 is not easily thermally decomposed.

Thereafter, when the plastic flow portion W3 inside the shoulder member 7 is backfilled into the pair of workpieces W by the pin member 6, the coating film R1 is returned into the friction-stirred region J so as to be unevenly distributed while being spread in a direction perpendicular to the axis P.

The coating film R1 described above forms an unwelded region R2 in the friction-stirred region J. This may lead to a decrease in the welding strength of the joint portion of the pair of workpieces W. Further, a crack may propagate from the unwelded region R2, and the welding strength of the joint portion of the pair of workpieces W may further decrease.

On the other hand, in the first embodiment, the coating film formed on at least one welding surface of the pair of workpieces W is removed in the coating film removal step S2 before the welding step S4.

Specifically, in coating film removal step S2, the coating film R1 formed on the welding surface is thermally decomposed by the heat generated by the rotation of the shoulder member 7, and is stirred and dispersed by the rotation of the shoulder member 7.

For this reason, it is possible to prevent the coating film R1 from remaining in the friction-stirred region J of the pair of workpieces W to be friction stir spot welding in welding step S4. Therefore, it is possible to prevent a decrease in the welding strength of the joint portion of the pair of workpieces W due to a coating film.

That is, according to coating film removal step S2, compared with conventional friction stir spot welding without performing coating film removal step S2, the amount of coating film per unit area present on the welding surfaces of the pair of workpieces W can be reduced to such an extent to prevent the welding strength of the joint portion of the pair of workpieces W from being reduced by the coating film. Further, by further optimizing the time (between t2 and t3) during which the shoulder member 7 stands by while the distal end of the shoulder member 7 is located at the standby position h1 in accordance with the pair of workpieces W, the amount of coating film per unit area present on the welding surfaces of the pair of workpieces W can be reduced.

In this case, according to the studies by the inventors of the present application, X-ray fluorescence analysis results confirmed that performing coating film removal step S2 greatly reduced the amount of coating film (carbon) per unit area present in a region, of the pair of workpieces W welded by friction stir spot welding, which is located inside the outer periphery of the shoulder member 7 when viewed in the axis P direction, as compared with the amount of coating film per unit area in the other region.

In coating film removal step S2, because the coating film is heated not inside the shoulder member 7 but near the distal end of the shoulder member 7, the coating film is easily heated. In addition, because the coating film can be heated while being formed on the welding surface, the coating film can be heated in an oxygen atmosphere, and the coating film is easily oxidized. Therefore, the coating film can be relatively easily thermally decomposed.

The coating film removed in coating film removal step S2 is limited to a region where the pair of workpieces W are welded by friction stir spot welding. For this reason, it is possible to minimize a decrease in the function (corrosion resistance and the like) given to the pair of workpieces W by a coating film.

Because coating film removal step S2 can be performed by using the device 1, no separate dedicated device is required for performing coating film removal step S2, and it is possible to efficiently prevent a decrease in the welding strength of the joint portion of the pair of workpieces W due to the coating film at low cost.

In addition, in coating film removal step S2, because the coating film is thermally decomposed by the heat generated by the rotation of the shoulder member 7, the coating film can be efficiently removed from the welding surface by removing the coating film by using the heat generated by the rotation of the shoulder member 7.

In coating film removal step S2, the amount of heat input from the rotating shoulder member 7 to the welding surface can be increased to heat the coating film to a temperature equal to or more than the thermal decomposition temperature by making the shoulder member 7 stand by for a predetermined time while the distal end of the shoulder member 7 is located at the standby position h1, thereby properly decomposing the coating film.

By performing return step S3, the shoulder member 7 is separated from the pair of workpieces W, so that the decomposed components of the coating film can be easily diffused into the air. The other embodiments will be described, focusing on differences from the first embodiment.

Second Embodiment

Figure 6:
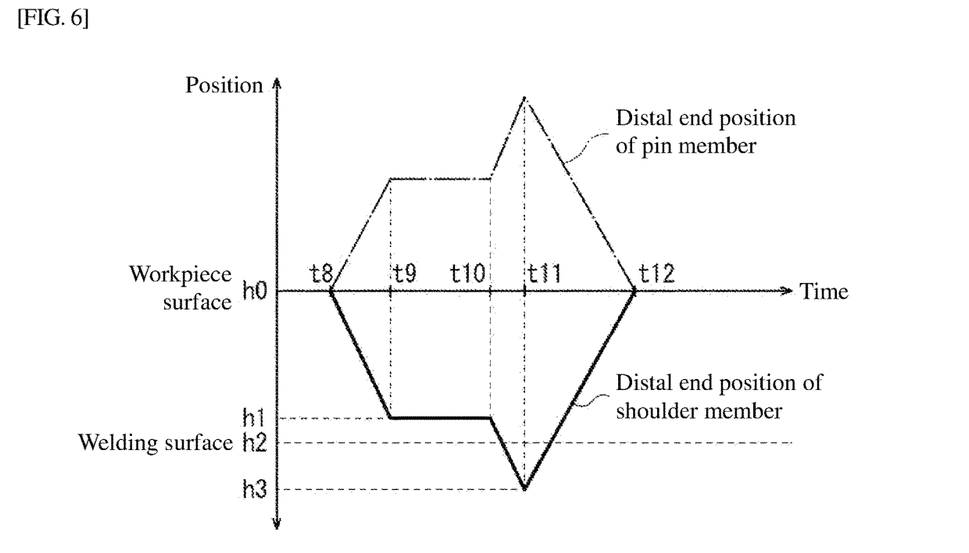
FIG. 6 is a graph showing distal end positions of a pin member and a shoulder member in a friction stir spot welding method according to a second embodiment.

FIG. 6 is a graph showing distal end positions of a pin member 6 and a shoulder member 7 in a friction stir spot welding method according to the second embodiment. In the friction stir spot welding method according to the second embodiment, a return step S3 is omitted.

That is, as shown in FIG. 6, in coating film removal step S2, in the interval between time t8 and time t9, the shoulder member 7 is plunged into one workpiece (a first plate material W1) while being rotated around an axis P, and in the interval between time t9 and time t10, the position of the distal end of the shoulder member 7 is held at a standby position h1.

In subsequent welding step S4, in the interval between time t10 and time t11, the distal end of the shoulder member 7 is moved from the standby position h1 to a stirring position h3 located closer to the other workpiece (a second plate material W2) than a welding position h2. In addition, the distal end of the shoulder member 7 is moved from the stirring position h3 to the surface position h0 in the interval between time t11 and time t12.

The second embodiment described above exhibits the same effects as those of the first embodiment. In addition, by moving the distal end of the shoulder member 7 moved to the standby position h1 to the stirring position h3 without returning the distal end of the shoulder member 7 to the surface position h0, the friction stir spot welding of the pair of workpieces W can be performed efficiently by using the heat generated by the rotation of the shoulder member 7 in coating film removal step S2. Note that the standby position h1 in the second embodiment may be the same as or different from the standby position h1 in the first embodiment.

Third Embodiment

Figure 7:
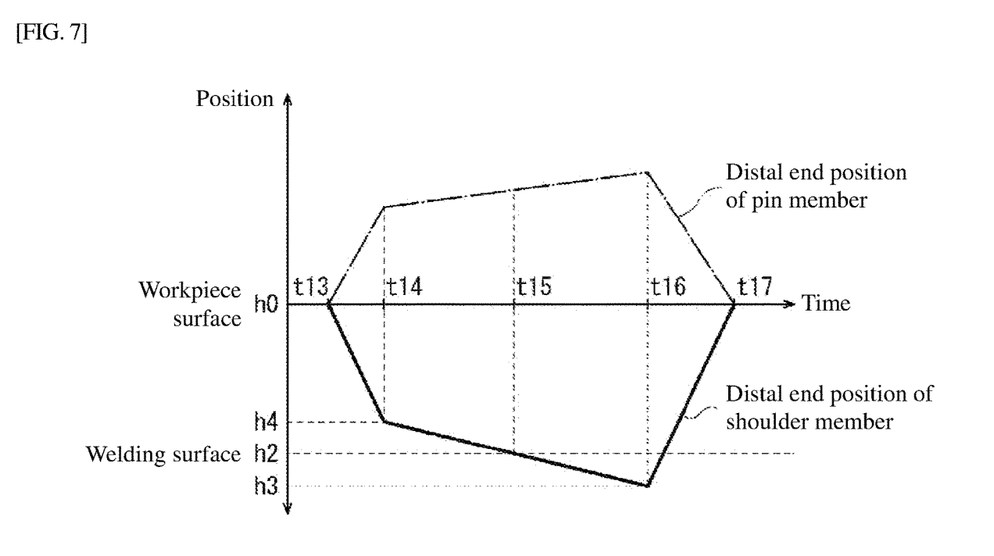
FIG. 7 is a graph showing distal end positions of a pin member and a shoulder member in a friction stir spot welding method according to a third embodiment.

FIG. 7 is a graph showing distal end positions of a pin member 6 and a shoulder member 7 in a friction stir spot welding method according to the third embodiment. In the friction stir spot welding method according to the third embodiment, return step S3 is omitted as in the second embodiment. In addition, coating film removal step S2 is performed while the shoulder member 7 is moved within one of the workpieces.

That is, as shown in FIG. 7, in coating film removal step S2, in the interval between time t13 and time t14, the distal end of the shoulder member 7 is plunged from the surface of one workpiece (the plate surface of a first plate material W1) to a reference position h4 located closer to the surface than the welding surface at a first speed while the shoulder member 7 is rotated around an axis P. In the interval between time t14 and time t15, the distal end of the shoulder member 7 is plunged from the reference position h4 to the welding position h2 at a second speed lower than the first speed.

The first and second speeds can be set as appropriate. At least the second speed is set to a value that can obtain a heat input amount necessary for thermally decomposing a coating film existing on the welding surfaces in the region subjected to friction stir spot welding before the distal end of the shoulder member 7 reaches the welding position h2 by the heat generated by the rotation of the shoulder member 7 plunged into the obverse surface of one of the workpieces.

As described above, in coating film removal step S2, plunging the distal end of the shoulder member 7 into one workpiece at the second speed from the reference position h4 to the welding position h2 makes it possible to properly decompose the coating film by heating the coating film to a temperature equal to or more than the thermal decomposition temperature by using the heat generated by the rotation of the shoulder member 7.

After coating film removal step S2, in the interval between time t15 and time t16, the distal end of the shoulder member 7 is moved from the welding position h2 to the stirring position h3 while the second speed is maintained, and welding step S4 is performed. Thereafter, in the interval between time t16 and time t17, the distal end of the shoulder member 7 is moved from the stirring position h3 to the surface position h0.

Note that the reference position h4 may be the same as or different from the standby position h1 in the second embodiment. The stirring position h3 in the second and third embodiments may be the same as or different from the stirring position h3 in the first embodiment. The moving speed of the shoulder member 7 from the welding position h2 to the stirring position h3 may be a speed other than the second speed.

Fourth Embodiment

Figure 8:
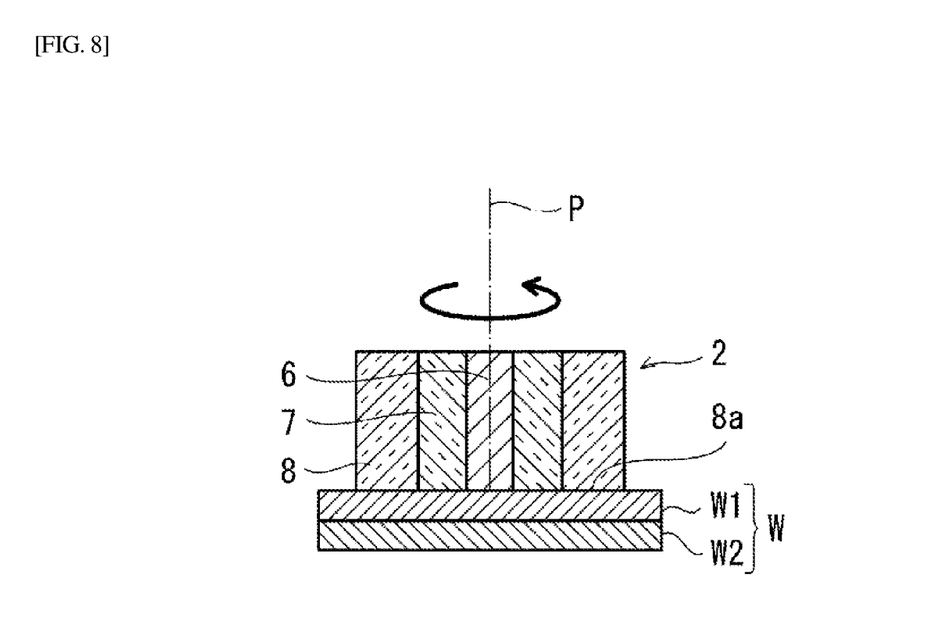
FIG. 8 is a view showing a preliminary step in a friction stir spot welding method according to a fourth embodiment.

FIG. 8 is a view showing preliminary step S6 in a friction stir spot welding method according to the fourth embodiment. The friction stir spot welding method according to the fourth embodiment is the same as the method according to the first embodiment except for having preliminary step S6 of standing by for a predetermined time while rotating the shoulder member 7 around the axis P in a state in which the surface of a first plate material W1 as one workpiece is pressed by an end face 8a of a clamp member 8, as shown in FIG. 8, before coating film removal step.

That is, preliminary step S6 is performed between the timings shown in FIGS. 4(a) and 4(b). Note that the standby time in preliminary step S6 may be different from the standby time (predetermined time (between t2 and t3)) in coating film removal step S2 in the first embodiment.

According to such a method, preliminary heating the surface of the first plate material W1 in preliminary step S6 makes it possible to further improve the welding strength of the joint portion of the pair of workpieces W as compared with the first embodiment. In the fourth embodiment, a coating film may or may not be formed on an outer surface of the pair of workpieces W (for example, the first plate material W1).

When a coating film is formed on an outer surface of the pair of workpieces W, performing preliminary step S6 will remove the coating film from the region of the outer surface of the pair of workpieces W which comes into contact with the pin member 6 and the shoulder member 7 and prevent the coating film from mixing into the friction-stirred region J of the pair of workpieces W. For this reason, the welding strength of the pair of workpieces W can be further improved.

According to the test (the cross tension test based on ISO16237) performed by the inventors using the pair of workpieces W having a coating film formed on an outer surface, for example, the breaking strength of the pair of workpieces W in the fourth embodiment was twice or more the breaking strength of the pair of workpieces W in the first embodiment.

The present invention is not limited to each embodiment described above, and the method according to each embodiment can be changed, added, or deleted without departing from the spirit of the present invention. The above embodiments may be arbitrarily combined with each other, and for example, some configurations or methods in one embodiment may be applied to other embodiments. Obviously, the pair of workpieces W are not limited to the pair of plate materials W1 and W2. The workpiece W may be a component of a vehicle such as an aircraft, an automobile, or a railway vehicle, or may be a component of a building.

INDUSTRIAL APPLICABILITY

According the present invention, it is possible to prevent a decrease by coating films in the welding strength of a joint portion of a pair of workpieces having coating films formed on welding surfaces in a case in which the pair of workpieces are welded by a refill friction stir spot welding method. This makes it possible to widely and suitably apply the present invention to each field using refill friction stir spot welding.

REFERENCE SIGNS LIST

P axis
h0 surface position
h1 standby position
h2 welding position
h4 reference position
W pair of workpieces
1 refill friction stir spot welding device
2 rotary tool
6 pin member
7 shoulder member
8 clamp member
8a end surface of clamp member

The invention claimed is:

1. A friction stir spot welding method of performing friction stir spot welding of a pair of workpieces having a coating film formed on at least one welding surface by using a refill friction stir spot welding device including a rotary tool, the rotary tool including a pin member that rotates around a predetermined axis and is provided to be able to advance and retract in a direction of the axis, a shoulder member that rotates around the axis while surrounding an outer periphery of the pin member and is provided independently of the pin member so as to be able to advance and retract in the direction of the axis, and a clamp member that has an end face able to press a surface of one of the pair of workpieces by coming into surface contact with the surface and is provided to surround an outer periphery of the shoulder member, the method comprising:

a coating film removal step of removing the coating film by plunging a distal end of the shoulder member into the one workpiece up to a position closer to the surface than the welding surface, while rotating the shoulder member around the axis, and rotating the shoulder member in a state in which the surface of one of the pair of workpieces, with the welding surfaces being overlaid on each other, is pressed by the end face of the clamp member; and a welding step of performing friction stir spot welding of the pair of workpieces after the coating film removal step by using the pin member and the shoulder member, wherein the coating film includes a resin.

2. The friction stir spot welding method according to claim 1, wherein in the coating film removal step, the coating film is thermally decomposed by heat generated by rotation of the shoulder member.

3. The friction stir spot welding method according to claim 1, wherein in the coating film removal step, after the distal end of the shoulder member is plunged into the one workpiece up to a standby position located closer to the surface than the welding surface while the shoulder member is rotated around the axis, the distal end of the shoulder member is made to stand by for a predetermined time while being located at the standby position.

4. The friction stir spot welding method according to claim 3, further comprising a return step of returning the distal end of the shoulder member from the standby position to the surface position of the one workpiece between the coating film removal step and the welding step.

5. A friction stir spot welding method of performing friction stir spot welding of a pair of workpieces having a coating film formed on at least one welding surface by using a refill friction stir spot welding device including a rotary tool, the rotary tool including a pin member that rotates around a predetermined axis and is provided to be able to advance and retract in a direction of the axis, a shoulder member that rotates around the axis while surrounding an outer periphery of the pin member and is provided independently of the pin member so as to be able to advance and retract in the direction of the axis, and a clamp member that has an end face able to press a surface of one of the pair of workpieces by coming into surface contact with the surface and is provided to surround an outer periphery of the shoulder member, the method comprising:

a coating film removal step of removing the coating film by plunging a distal end of the shoulder member into the one workpiece up to a position closer to the surface than the welding surface, while rotating the shoulder member around the axis, and rotating the shoulder member in a state in which the surface of one of the pair of workpieces, with the welding surfaces being overlaid on each other, is pressed by the end face of the clamp member; and a welding step of performing friction stir spot welding of the pair of workpieces after the coating film removal step by using the pin member and the shoulder member, wherein in the coating film removal step, the distal end of the shoulder member is plunged at a first speed from the surface of the one workpiece to a reference position located closer to the surface than the welding surface of the one workpiece while the shoulder member is rotated around the axis, and the distal end of the shoulder member is plunged from the reference position to the welding position at a second speed lower than the first speed.

6. The friction stir spot welding method according to claim 1, further comprising a preliminary step of standing by for a predetermined time while rotating the shoulder member around the axis in a state in which the surface of the one workpiece is pressed by the end face of the clamp member before the coating film removal step.

7. A refill friction stir spot welding device that performs friction stir spot welding of a pair of workpieces having a coating film formed on at least one welding surface, the device comprising:

a rotary tool;

a tool driving unit configured to drive the rotary tool; and a control unit configured to control the tool driving unit, wherein the rotary tool includes a pin member that rotates around a predetermined axis and is provided to be able to advance and retract in a direction of the axis, a shoulder member that rotates around the axis while surrounding an outer periphery of the pin member and is provided independently of the pin member so as to be able to advance and retract in the direction of the axis, and a clamp member that has an end face able to press a surface of one of the pair of workpieces by coming into surface contact with the surface and is provided to surround an outer periphery of the shoulder member, the control unit includes a processor and a storage medium readable by the processor, the storage medium storing a control program which executes:

coating film removal control in which the processor controls the tool driving unit to remove the coating film by plunging a distal end of the shoulder member into the one workpiece up to a position closer to the surface than the welding surface, while rotating the shoulder member around the axis, and rotating the shoulder member in a state in which the surface of one of the pair of workpieces, with the welding surfaces being overlaid on each other, is pressed by the end face of the clamp member, and welding control in which the processor controls the tool driving unit to perform friction stir spot welding of the pair of workpieces after the coating film removal control by using the pin member and the shoulder member, and the coating film includes a resin.

8. The friction stir spot welding method according to claim 1, further comprising:

an alignment step of aligning the distal end of the shoulder member and a distal end of the pin member to a surface position of the one workpiece prior to the coating film removal step; and a return step of returning the distal end of the shoulder member and the distal end of the pin member to the surface position of the one workpiece at the alignment step between the coating film removal step and the welding step.

\* \* \* \* \*